Jan. 3, 1928.  
S. RUSSO  
1,655,245
PORTABLE COMBINED PHONOGRAPH AND MOVING PICTURE MACHINE
Filed March 24, 1927
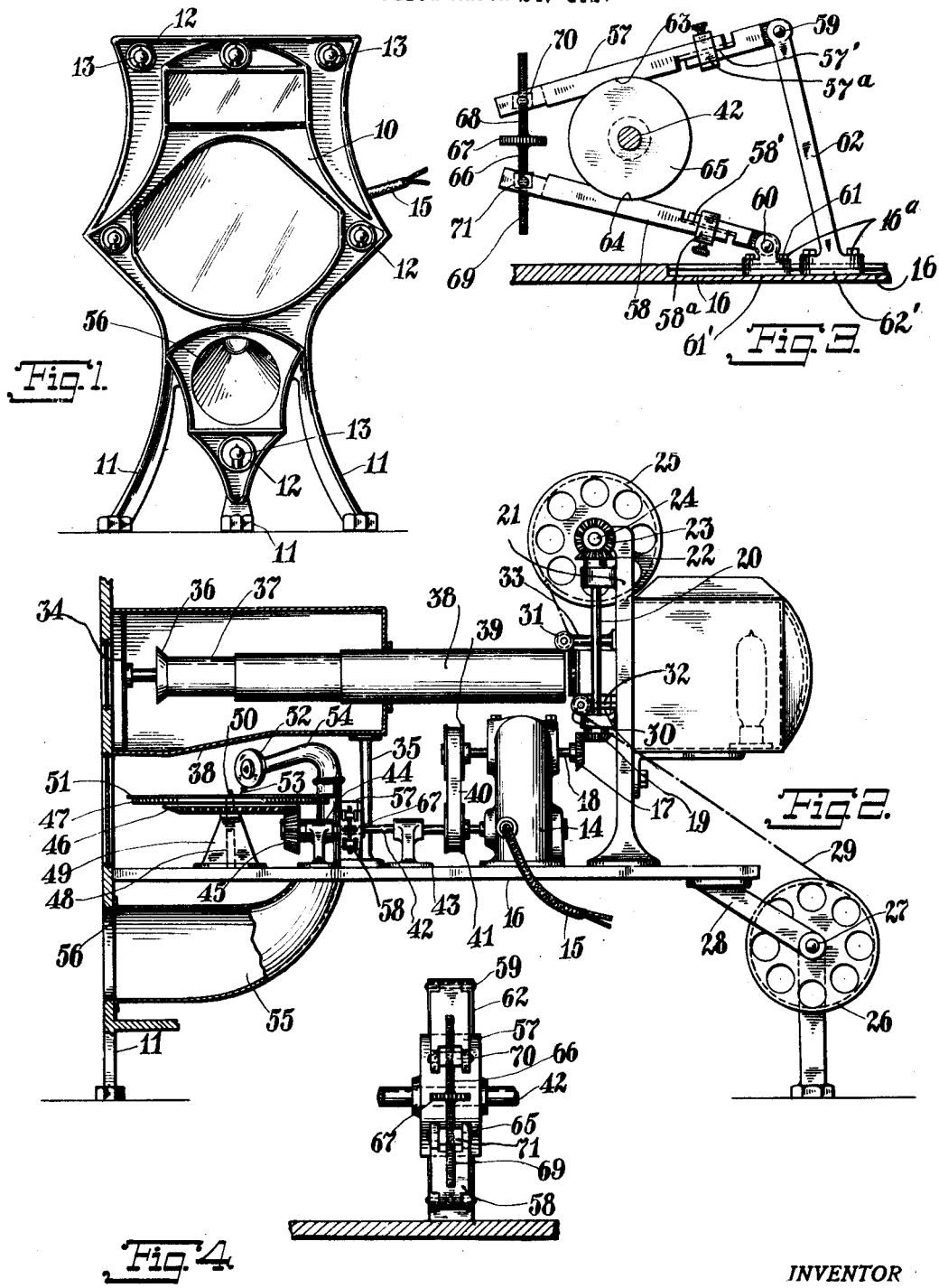
INVENTOR
BY *Salvatore Russo*
ATTORNEY Patented Jan. 3, 1928.

1,655,245

UNITED STATES PATENT OFFICE.

SALVATORE RUSSO, OF NEW YORK, N. Y., ASSIGNOR OF ONE-HALF TO ARNOLD MIGLIACCIO.

PORTABLE COMBINED PHONOGRAPH AND MOVING-PICTURE MACHINE.

Application filed March 24, 1927. Serial No. 177,946.

This invention relates to a new and useful device in the nature of a portable combined phonograph and projecting machine, adapted for the purpose of projecting moving pictures and producing phonographic accompaniment for the said moving pictures.

The object of the invention is to provide a portable device of the class described, of novel construction and arrangement of parts, hereinafter more fully described, claimed and illustrated in the accompanying drawing.

Fig. 1 is a front elevational view of my improved device.

Fig. 2 is an enlarged side elevational view partly shown in section, of the mechanism as embodied in my improved device.

Fig. 3 is a side elevational detail view of the synchronizing mechanism as embodied in my improved device, a certain part being shown in section.

Fig. 4 is a fragmentary front elevational view thereof, a certain part being shown in section.

As here embodied my improved device comprises a cabinet 10, or container, of box-like construction, of any desirable suitable ornamental design, mounted on supporting members 11, or legs. The cabinet 10, is provided with suitable openings 12, in which electric light bulbs 13, are positioned, mounted in the usual sockets and connected to any convenient source of electric current, so as to provide additional ornamental effect. The cabinet 10, is of suitable size to accommodate or to house the mechanism as illustrated in Fig. 2 of the accompanying drawing.

As here embodied the mechanism as embodied in my improved device comprises an electric motor 14, connected by means of the electric cable 15, to any suitable source of electric current. The electric motor 14, is mounted on the base member 16. The bevel pinion 17, is attached to the armature shaft 18 of the electric motor 14 and meshes with a similar bevel pinion 19 attached to the shaft 20, rotatively mounted in the bracket 21. The bracket 21 is mounted on the base member 16, and extends upwardly therefrom. The bevel pinion 22, is attached to the shaft 20 and meshes with a similar bevel pinion 23 attached to the shaft 24 rotatively mounted in the bracket 21. The shaft 24 is adapted to removably receive the reel 25, and is provided with a means of rotating the said reel 25, when the shaft 24, is rotated or driven by the electric motor 14. A similar reel 26 is removably and rotatively mounted on the shaft 27, carried by the bracket 28 attached to the base member 16. The above mentioned reel 26, is adapted to hold the moving picture strip 29, such as commonly used for moving pictures or projecting machines, and is extended over the rollers 30 and 31 rotatively mounted on the shafts carried by the brackets 32 and 33, attached to the bracket 21. The moving picture strip 29, is secured to the reel 25 in the usual manner. The lens 34, is supported by, and is attached to the bracket 35 mounted on the base member 16. The focusing lens 36, is mounted in the usual focusing holder 37, mounted on the extended element 38, of the bracket 35.

The above described construction is such as will permit the electric motor 14, when rotated to rotate the reel 25, as a means of moving the moving picture strip 29, so as to project, by means of the lenses 34 and 36, the pictures on the strip 29, on a screen, such as usually provided for this purpose. It should be understood that the base member 16, is mounted in and secured to the cabinet 10.

The pulley 39 is attached to the above mentioned armature shaft 18, of the electric motor 14. The flexible member 40, a belt or the like, is extended over the pulley 39, and over a similar pulley 41, attached to the shaft 42. The shaft 42 is rotatively mounted in the brackets 43 and 44, attached to the base member 16. The bevel pinion 45, is attached to the shaft 42, and meshes with bevel gear 46, attached to the disc 47. The disc 47 is mounted on the shaft 48, rotatively mounted in the bracket 49. The disc 47, is provided with an axial extended portion 50, adapted to receive a phonograph record 51, such as commonly used in connection with phonographs. The reproducer 52, is of common construction, and is adapted to removably support the reproducer needle 53. The reproducer 52, is mounted on the usual reproducer arm 54, pivotally attached in the usual manner to the phonograph horn 55. The horn 55, is of suitable shape or contour so as to have its opening 56, or mouth flush with the front portion of the cabinet 10, which is provided with an opening adapted to correspond with the mouth of the horn 55.

The above described construction is such as will permit the electric motor 14, when rotated to rotate the phonograph record 51, so as to produce any desired music combination of words, sounds or the like, to correspond with and to accompany the moving pictures projected simultaneously by my improved device.

In Figs. 3 and 4 of the accompanying drawing, I have shown an upper adjustable arm 57, and a lower adjustable arm 58, pivotally attached as at 59 and 60 by a pin, or the like, carried in the brackets 61 and 62, slidably attached in the above mentioned base member 16. The arms 57 and 58 are provided with recesses 63 and 64, respectively, adapted to engage a portion of the periphery of the disc 65, or pulley, secured to the shaft 42. The adjusting member 66, is provided with an intermediate enlarged portion 67, preferably serrated. The adjusting member 66, is provided with oppositely extended elements 68 and 69, having cut out or formed thereon, a right hand thread and left hand thread, respectively, adapted to engage in threaded apertures formed in the block members 70 and 71. The block members 70 and 71, are pivotally attached to the free extremities of the above mentioned arms 57 and 58, respectively.

The above described construction is such as will permit the arms 57 and 58, to engage the disc 65, when the adjusting member 66, is rotated, as a means of impeding the speed of the shaft 42 by changing the slippage of belt 40, as a means of synchronizing the above described phonograph with the moving pictures being projected simultaneously. The brackets 61 and 62 are slidable in the base 16 by means of a slot 16' in the base engaged by slides 61' and 62' projecting from the brackets, and screw 16ᵃ serves to lock the brackets in adjusted positions. The arms 57 and 58 are adjustable by means of portions thereof being slidably engaged to each other as at 57' and 58' and lockable in position by clamps 57ᵃ and 58ᵃ. By changing the position of brackets 61 and 62, and the lengths of arms 57 and 58, the effective leverage on the wheel 65 may be adjusted.

It is to be understood that my invention may also be constructed together with any suitable slot device which permits the operation of my device only upon the insertion of a coin.

While I have illustrated and described the preferred form, construction, and arrangement of the several elements employed, it will be understood that the device is nevertheless susceptible of considerable modification therein, and I therefore reserve the privilege of resorting to all such changes as may be fairly embodied within the spirit and scope of the invention as claimed.

Having thus described my invention, what I claim as new and desire to protect by Letters Patent of the United States is as follows:

1. The combination with a projection machine having an operating shaft provided with a pulley, of a phonograph having an operating shaft, a pulley on said phonograph shaft, a belt connecting the said pulleys, a disc on said phonograph shaft, a base, brackets adjustably attached to the base, an upper and a lower arm pivotally attached to the brackets, and engaging a portion of the periphery of said disc, and an adjusting member connected to the arms for changing the pressure of the arms against the disc, to impede the speed of the phonograph so as to synchronize the phonograph with the projecting machine.

2. The combination with a projection machine having an operating shaft provided with a pulley, of a phonograph having an operating shaft, a pulley on said phonograph shaft, a belt connecting the said pulleys, a disc on said phonograph shaft, a base, brackets attached to the base, an upper and a lower arm pivotally attached to the brackets, and engaging a portion of the periphery of said disc, and an adjusting member connected to the arms for changing the pressure of the arms against the disc, to impede the speed of the phonograph, so as to synchronize the phonograph with the projecting machine.

3. The combination with a projection machine having an operating shaft provided with a pulley, of a phonograph having an operating shaft, a pulley on said phonograph shaft, a belt connecting the said pulleys, a disc on said phonograph shaft, a base, brackets adjustably attached to the base, an upper and a lower arm pivotally attached to the brackets, and engaging a portion of the periphery of said disc, said arms being adjustable in length and an adjusting member connected to the arms for changing the pressure of the arms against the disc, to impede the speed of the phonograph, so as to synchronize the phonograph with the projecting machine.

In testimony whereof I have affixed my signature.

SALVATORE RUSSO.